US012656823B2

(12) United States Patent
Feng

(10) Patent No.: US 12,656,823 B2
(45) Date of Patent: Jun. 16, 2026

(54) FLEXIBLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Zikang Feng, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 313 days.

(21) Appl. No.: 17/432,928

(22) PCT Filed: Jul. 20, 2021

(86) PCT No.: PCT/CN2021/107257
§ 371 (c)(1),
(2) Date: Mar. 5, 2024

(87) PCT Pub. No.: WO2022/217771
PCT Pub. Date: Oct. 20, 2022

(65) Prior Publication Data
US 2025/0155928 A1 May 15, 2025

(30) Foreign Application Priority Data
Apr. 13, 2021 (CN) .......................... 202110394344.5

(51) Int. Cl.
*G06F 1/16* (2006.01)

(52) U.S. Cl.
CPC .................................. *G06F 1/1652* (2013.01)

(58) Field of Classification Search
CPC combination set(s) only.
See application file for complete search history.

(56) References Cited

U.S. PATENT DOCUMENTS

| 5,128,662 | A | * | 7/1992 | Failla | .................... G06F 1/1624 |
| | | | | | 345/905 |
| 5,229,920 | A | * | 7/1993 | Spaniol | ................. G06F 1/1679 |
| | | | | | 361/679.55 |
| 6,762,929 | B2 | * | 7/2004 | Sawyer | ............... H04M 1/0268 |
| | | | | | 345/905 |

(Continued)

FOREIGN PATENT DOCUMENTS

| CN | 1750745 A | 3/2006 |
| CN | 201974728 U | 9/2011 |

(Continued)

*Primary Examiner* — Lisa Lea-Edmonds
(74) *Attorney, Agent, or Firm* — Rivka Friedman

(57) ABSTRACT

A flexible display device is provided. The flexible display device comprises a first housing, a second housing, and a flexible display panel. The first housing includes a first surface and a second surface disposed opposite each other. In a first form, the second housing is away from the first housing, a first included angle is formed between the flexible display panel and the first surface, and the first included angle is greater than 0° and less than 180°; in the second form, the second housing is located at one edge of the first housing, and the flexible display panel covers the second surface.

19 Claims, 5 Drawing Sheets

(56) References Cited

U.S. PATENT DOCUMENTS

| | | | | |
|---|---|---|---|---|
| 6,806,850 B2 * | 10/2004 | Chen | G06F 1/1616 | 353/72 |
| 7,426,107 B2 * | 9/2008 | Yeh | G06F 1/1626 | 345/170 |
| 7,440,265 B2 * | 10/2008 | Ou Yang | G06F 1/1652 | 455/575.4 |
| 7,639,237 B2 * | 12/2009 | Perkins | G09F 9/301 | 345/173 |
| 7,724,511 B2 * | 5/2010 | Jacobs | G06F 1/1681 | 361/679.05 |
| 8,151,501 B2 * | 4/2012 | Bemelmans | G06F 1/1615 | 40/610 |
| 8,259,437 B2 * | 9/2012 | Vesely | G06F 1/1679 | 345/184 |
| 8,378,932 B2 * | 2/2013 | Fein | H04M 1/0268 | 362/362 |
| 8,988,863 B2 * | 3/2015 | Hung | G06F 1/1601 | 361/679.08 |
| 11,023,015 B1 * | 6/2021 | Wen | G06F 1/1679 | |
| 11,449,096 B2 * | 9/2022 | Zhang | G06F 1/1681 | |
| 11,487,331 B2 * | 11/2022 | Wen | G06F 1/1616 | |
| 11,602,063 B2 * | 3/2023 | Wen | G06F 1/1624 | |
| 2004/0052037 A1 * | 3/2004 | Sawyer | G06F 1/1652 | 361/679.05 |
| 2007/0004475 A1 * | 1/2007 | Kuo | H04M 1/0268 | 455/575.3 |
| 2007/0146243 A1 * | 6/2007 | Ou Yang | G06F 1/1601 | 345/76 |
| 2007/0206349 A1 * | 9/2007 | Jacobs | G06F 1/1616 | 361/679.05 |
| 2017/0360170 A1 * | 12/2017 | Lin | G06F 1/1615 | |
| 2018/0108330 A1 * | 4/2018 | Wallace | G06F 1/1652 | |
| 2022/0039273 A1 * | 2/2022 | Zhang | G06F 1/1616 | |
| 2025/0155928 A1 * | 5/2025 | Feng | G06F 1/1616 | |

FOREIGN PATENT DOCUMENTS

| | | |
|---|---|---|
| CN | 102298421 A | 12/2011 |
| CN | 102984893 A | 3/2013 |
| CN | 203759605 U | 8/2014 |
| CN | 104732890 A | 6/2015 |
| CN | 208044998 U | 11/2018 |
| CN | 208044999 U | 11/2018 |
| CN | 109933146 A | 6/2019 |
| CN | 111090301 A | 5/2020 |
| CN | 111091759 A | 5/2020 |
| CN | 111326070 A | 6/2020 |
| CN | 111782001 A | 10/2020 |
| CN | 112615952 A | 4/2021 |
| CN | 113112922 A | 7/2021 |

* cited by examiner

FLEXIBLE DISPLAY DEVICE

FIELD OF INVENTION

The present disclosure relates to a field of display technology, and especially relates to a flexible display device.

BACKGROUND OF INVENTION

At present, a foldable display device equipped with a flexible display panel has become a bestseller, and the flexible display panel has brought more possibilities for the development of the terminal market However, most of the foldable display devices available on the market, when being in a deployed form, can only be used in a single form, instead of multiple forms.

SUMMARY OF INVENTION

Technical Problem

Therefore, the object of the present disclosure is to provide a flexible display device that can be used in multiple forms.

Solutions for the Problem

Technical Solutions

The present disclosure provides a flexible display device, comprising:

a first housing including a first surface and a second surface disposed opposite each other;

a second housing disposed on one side of the first housing; and a flexible display panel, one end of which is curlably connected to the first housing and another end of which is fixedly connected to the second housing, wherein the flexible display panel is deployable or scrollable between the first housing and the second housing;

wherein the flexible display device has a first form and a second form; in the first form, the second housing is away from the first housing, a first included angle is formed between the flexible display panel and the first surface, and the first included angle is greater than 0° and less than 180°; in the second form, the second housing is located at one edge of the first housing, and the flexible display panel covers the second surface.

In an embodiment, the flexible display device also has a third form; in the third form, the flexible display panel is scrolled, and the second housing presses against one edge of the first housing.

In an embodiment, the flexible display device also has a fourth form; in the fourth form, the second housing is away from the first housing, a second included angle is formed between the flexible display panel and the first surface, and the second included angle is greater than or equal to 180° and less than 360°.

In an embodiment, the flexible display device further comprises a support component, one end of which is rotatably connected to the first housing and another end of which is fixedly connected to the second housing; wherein, in the first form, a third included angle is formed between the support component and the first surface so as to support the second housing, the third included angle is greater than 0° and less than 180°.

In an embodiment, in the second form, the support component is parallel to the first housing, so as to fix the flexible display panel to the second surface.

In an embodiment, the support component is telescopic.

In an embodiment, the first housing includes a first scroll, one end of the flexible display panel is scrollably disposed on the first scroll, and the other end of the flexible display panel is fixedly connected to the second housing.

In an embodiment, the flexible display device further comprises a first roller located between the first scroll and the second housing, wherein in the first form, the flexible display panel contacts the first roller.

In an embodiment, the flexible display device further comprises a second roller located between the first scroll and the second housing, in the second form, the flexible display panel contacts the second roller.

In an embodiment, the second housing includes a second scroll, in the second form, the flexible display panel is rolled onto the second scroll and covers a surface of the second scroll facing the first housing.

In an embodiment, the flexible display device further comprises a first roller and a second roller, both located between the first scroll and the second housing and disposed opposite each other; wherein, in the first form the flexible display panel contacts the first roller, and in the second form the flexible display panel contacts the second roller.

In an embodiment, the flexible display panel has a display surface and a non-display surface disposed opposite each other, and the non-display surface is fixedly connected to the second housing.

In an embodiment, the flexible display device further comprises a fixing component, wherein in the second form, the fixing component fixes the second housing onto the first housing.

In an embodiment, the flexible display device further comprises a keyboard fixedly disposed on the first surface or detachably mounted onto the first surface.

In an embodiment, the flexible display device further comprises a touch module; wherein in the second form, the first housing is configured to provide a rigid supporting surface of the touch module.

The present disclosure also provides a flexible display device. The flexible display device comprises a first housing, a second housing, and a flexible display panel; the first housing includes a first surface and a second surface disposed opposite each other; the second housing is disposed on one side of the first housing; one end of the flexible display panel is curlably connected to the first housing, and another end of the flexible display panel is fixedly connected to the second housing, wherein the flexible display panel is deployable or scrollable between the first housing and the second housing; wherein the flexible display device has a first form and a second form; in the first form, the second housing is away from the first housing, a first included angle is formed between the flexible display panel and the first surface, and the first included angle is greater than 0° and less than 180°; in the second form, the second housing is located at one edge of the first housing, and the flexible display panel covers the second surface.

The present disclosure further provides a flexible display device, comprising:

a first housing including a first surface and a second surface disposed opposite each other;

a second housing disposed on one side of the first housing; and a flexible display panel, one end of which is curlably connected to the first housing and another end of which is fixedly connected to the second housing, wherein the flexible display panel is deployable or scrollable between the first housing and the second housing; and a support component, one end of which is rotatably connected to the first housing and another end of which is fixedly connected to the second housing.

In an embodiment, the support component is telescopic.

In an embodiment, the first housing includes a first scroll, one end of the flexible display panel is scrollably disposed on the first scroll, and the other end of the flexible display panel is fixedly connected to the second housing; wherein the second housing includes a second scroll and connecting portions located at both sides of the second scroll, the support component is fixedly connected to the connecting portions.

In an embodiment, the flexible display device further comprises a first roller and a second roller, both located between the first scroll and the second housing and disposed opposite each other.

Advantageous Effects of the Invention

Beneficial Effects

The flexible display panel of the flexible display device of the present disclosure can be deployed or scrolled according to a relative motion between the second housing and the first housing, thereby being switched between the first form and the second form. In the first form, the second housing is away from the first housing, the first included angle is formed between the flexible display panel and the first surface, and the flexible display device may be used as a laptop computer. In the second form, the second housing is at one edge of the first housing, the flexible display panel covers the second surface, and the flexible display device may be used as a tablet computer. That is, the flexible display device of the present disclosure may be used in at least two forms, one of which is a laptop computer form, and the other is a tablet computer form.

DESCRIPTION OF DRAWINGS OF THE INVENTION

Brief Description of Several Views of the Drawings

In order to clearly illustrate the technical solution in the present disclosure, the following briefly introduces the accompanying drawings used in the description of the embodiments. Obviously, the drawings in the following description merely show some of the embodiments of the present disclosure. As regards one of ordinary skill in the art, other drawings may be obtained in accordance with these accompanying drawings without making creative efforts.

DESCRIPTION OF EMBODIMENTS OF THE INVENTION

Detailed Description of Preferred Embodiments

Figure 1:
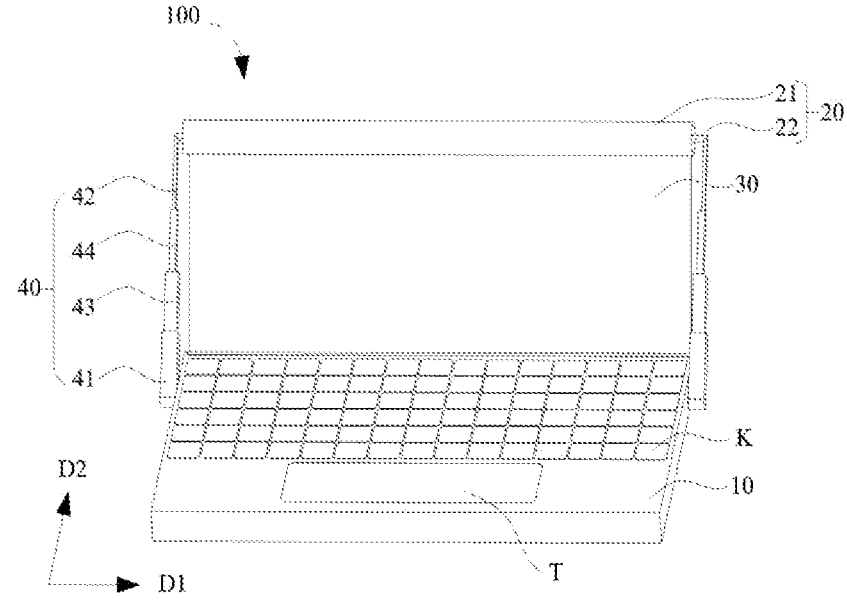
FIG. 1 is a schematic perspective view of a flexible display device in a first form, provided by an embodiment of the present disclosure.

In the following description, the technical solutions in the embodiments of the present disclosure will be described clearly and completely in conjunction with the accompanying drawing in the embodiment of the present disclosure. It is clear that the embodiments described herein is only a part of the embodiments of the disclosure, instead of all embodiments. Base on the embodiments in the present disclosure, all other embodiments that are obtained by one of ordinary skill in the art without making creative efforts shall fall within the scope of protection of the present disclosure.

A flexible display device in the embodiments of the present disclosure may be a cell phone, a tablet computer, a desktop computer, a laptop computer, an E-reader, a portable computer, an electronic display screen, a notebook computer, an ultra-mobile personal computer (UMPC), a netbook, a cellular phone, a personal digital assistant (PDA), an augmented reality (AR)/virtual reality (VR) equipment, a media player, a wearable device, a digital camera, and a vehicle navigator etc. The present embodiment explains the invention in the context of an example, in which the flexible display device is a cell phone.

The flexible display device provided by the embodiment of the present disclosure is explained in detail hereinbelow, referring to the drawings.

Figure 2:
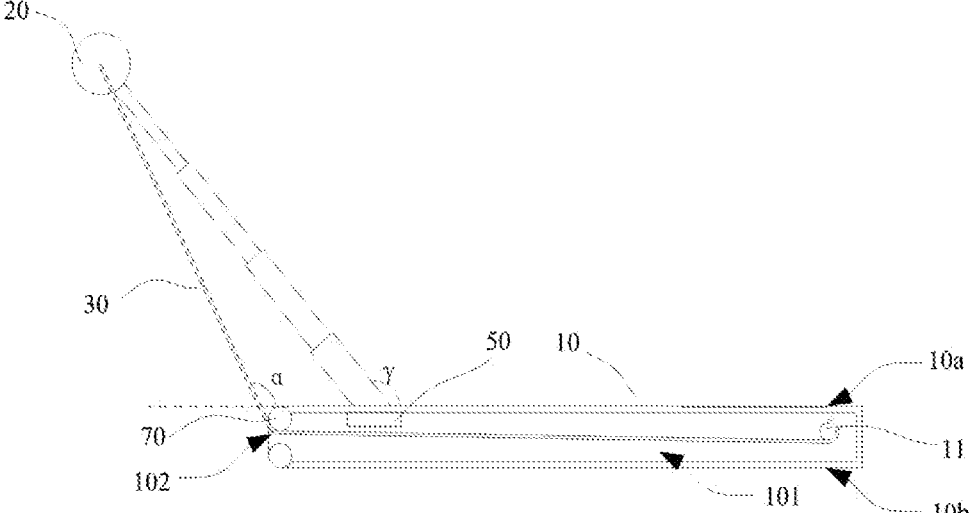
FIG. 2 is a partial side view of the flexible display device in FIG. 1 in the first form.
Figure 3:
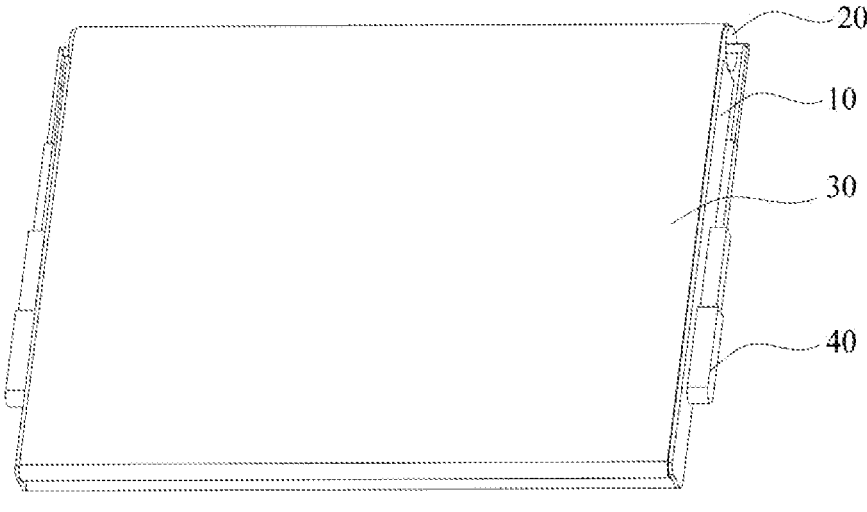
FIG. 3 is a schematic perspective view of the flexible display device in FIG. 1 in a second form.
Figure 4:
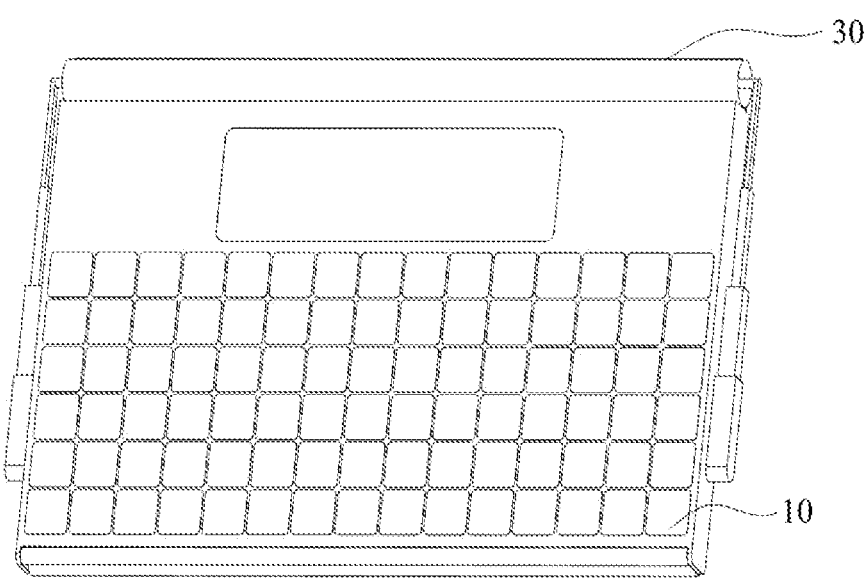
FIG. 4 is a schematic perspective view from another angle of the flexible display device in FIG. 1 in the second form.
Figure 5:
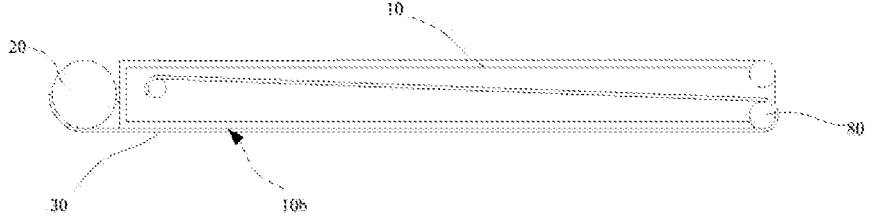
FIG. 5 is a partial side view of the flexible display device in FIG. 1 in the second form.

Referring to FIGS. 1 and 2, FIG. 1 is a schematic perspective view of a flexible display device in a first form, provided by an embodiment of the present disclosure. FIG. 2 is a partial side view of the flexible display device in FIG. 1 in the first form. The flexible display device 100 comprises a first housing 10, a second housing 20, and a flexible display panel 30. The first housing 10 includes a first surface 10a and a second surface 10b disposed opposite each other. The second housing 20 is disposed on one side of the first housing 10. One end of the flexible display panel 30 is curlably connected to the first housing 10 and another end of the flexible display panel 30 is fixedly connected to the second housing 20. The flexible display panel 30 is deployable or scrollable between the first housing 10 and the second housing 20. The flexible display device 100 has a first form. In the first form, the second housing 20 is away from the first housing 10, a first included angle α is formed between the flexible display panel 30 and the first surface 10a, and the first included angle α is greater than 0° and less than 180°. Referring to FIGS. 3-5, FIG. 3 is a schematic perspective view of the flexible display device in FIG. 1 in a second form, FIG. 4 is a schematic perspective view from another angle of the flexible display device in FIG. 1 in the second form, and FIG. 5 is a partial side view of the flexible display device in FIG. 1 in the second form. The flexible display device 100 also has a second form in which the second housing 20 is located at one edge of the first housing 10, and the flexible display panel 30 covers the second surface 10*b*. Wherein, the first form can also be referred as a "laptop computer form", and the second form can also be referred as a "tablet computer form".

The flexible display panel 30 of the flexible display device 100 of the present disclosure can be deployed or scrolled according to a relative motion between the second housing 20 and the first housing 10, and thus being switched between the first form and the second form. In the first form, the second housing 20 is away from the first housing 10, the first included angle α is formed between the flexible display panel 30 and the first surface 10*a*, and the flexible display device 100 may be used as a laptop computer. In the second form, the second housing 20 is at one edge of the first housing 10, the flexible display panel 30 covers the second surface 10*b*, and the flexible display device 100 may be used as a tablet computer.

Figure 6:
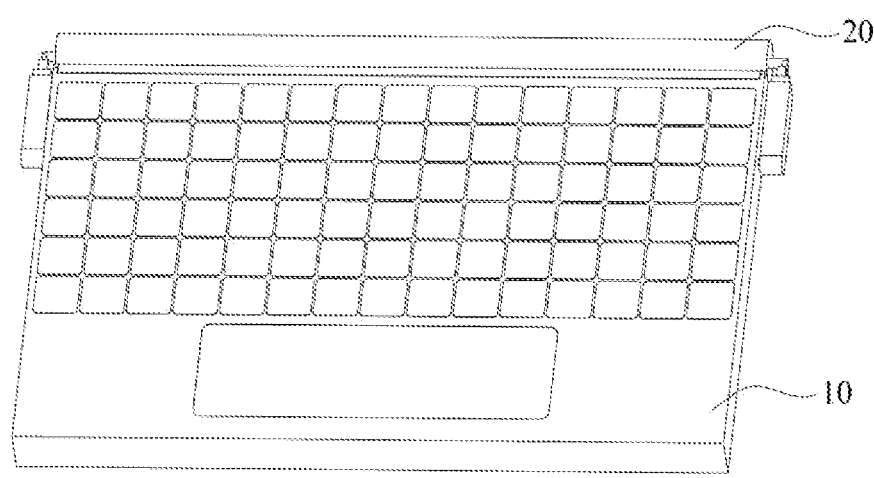
FIG. 6 is a schematic perspective view of the flexible display device in FIG. 1 in a third form.
Figure 7:
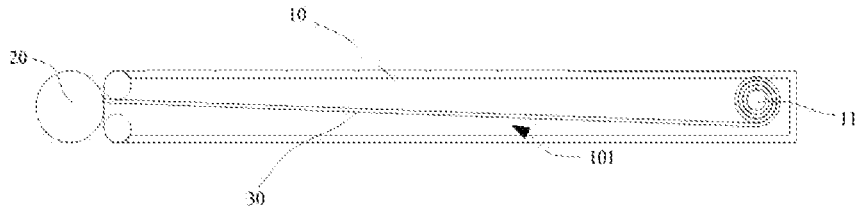
FIG. 7 is a partial side view of the flexible display device in FIG. 1 in the third form.
Figure 8:
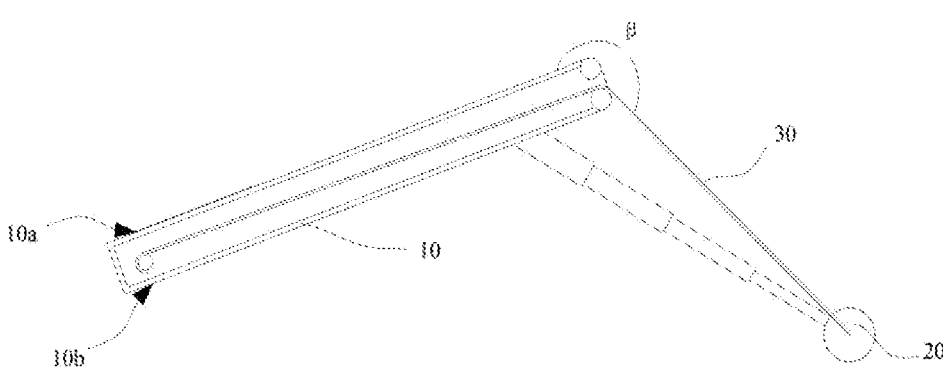
FIG. 8 is a partial side view of the flexible display device in FIG. 1 in a fourth form.

The flexible display device 100 also has a third form. Referring to FIGS. 6 and 7, FIG. 6 is a schematic perspective view of the flexible display device in FIG. 1 in the third form, and FIG. 7 is a partial side view of the flexible display device in FIG. 1 in the third form. In the third form, the flexible display panel 30 is scrolled, and the second housing 20 presses against one edge of the first housing 10. The third form can also be referred as a "turned-off form". Referring to FIG. 8, it is a partial side view of the flexible display device in FIG. 1 in a fourth form. In the fourth form, the second housing 20 is away from the first housing 10, a second included angle β, which is greater than the first included angle α, is formed between the flexible display panel 30 and the first surface 10*a*. The second included angle β is greater than or equal to 180° and less than 360°. The fourth form can also be referred as a "tablet-computer-with-stand form". Components and forms of the flexible display device 100 are described in detail hereinbelow.

The first housing 10 serves as a base of the laptop computer in the first form, serves as a backplane of the tablet computer in the second form, serves as a housing of the tablet computer in the third form, and serves as a stand of a tablet computer in the fourth form. A shape of the first housing 10 is not defined in the present disclosure. In an embodiment, in order to be compatible with multiple forms described in the present disclosure, the first housing 10 is essentially rectangular. A long side direction of the first housing 10 is a first direction D1, and a short side direction of the first housing 10 is a second direction D2. In an embodiment, a keyboard K and a touchpad T are disposed on the first surface 10*a* of the first housing 10. In another embodiment, the keyboard K is detachably disposed on the first surface 10*a*. In the first form, the flexible display device 100 is used as a laptop computer. Compared with a virtual keyboard, the keyboard K disposed on the first surface 10*a* can provide the user with real touch sense, thereby enhancing user experience. The second surface 10*b* is a flat surface. Therefore, in the second form, the flexible display panel 30 may be disposed on the second surface 10*b* for displaying and touch controlling.

The first housing 10 is also used for containing the flexible display panel 30. One end of the flexible display panel 30 is curlably disposed on the first housing 10. Specifically, the first housing 10 includes a first scroll 11, one end of the flexible display panel 30 is scrollably disposed on the first scroll 11, and the other end of the flexible display panel 30 is fixedly connected to the second housing 20. The flexible display panel 30 can be scrolled onto the first scroll 11, thereby decreasing a size of the flexible display device 100, and thereby enhancing portability. A location of the first scroll 11 is not defined in the present disclosure. The first scroll 11 can be located at a surface of the first housing 10 facing the second housing 20, or the first scroll 11 can also be contained inside the first housing 10. As shown in FIG. 2, in an embodiment, in order to prevent the flexible display panel 30 from being damaged by external forces, the first housing 10 includes a hollow cavity 101. The first scroll 11 is contained inside the hollow cavity 101. The first scroll 11 extends along the first direction D1. An opening 102 is formed at an end of the first housing 10 close to the second housing 20. The opening 102 is connected with the hollow cavity 101. The flexible display panel 30 connects the second housing 20 and the first scroll 11 through the opening 102. Specifically, the first scroll 11 is disposed on one end of the hollow cavity 101 away from the opening 102. It is understandable that the hollow cavity 101 may also be used to contain other components of the flexible display device 100, such as a driving circuit board for the flexible display panel 30.

Figure 9:
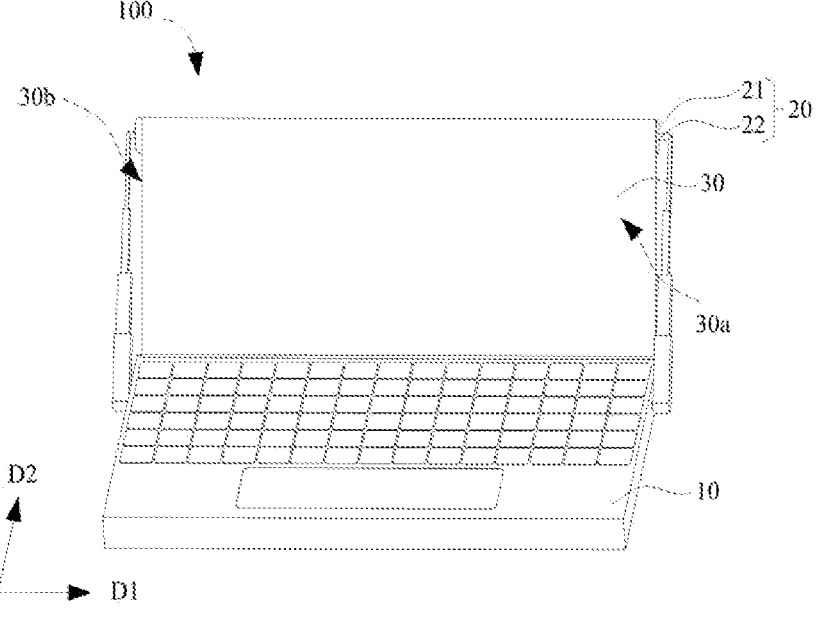
FIG. 9 is a schematic perspective view of the flexible display device in FIG. 1 in a fifth form.

The second housing 20 is disposed in the second direction D2 of the first housing 10, that is, the short side direction. In an embodiment, the second housing 20 extends along the first direction D1, and a length of the second housing 20 is essential the same as a length of the first housing 10. A shape of the second housing 20 is not defined in the present disclosure. The shape of the second housing 20 may be cylindrical, rectangular parallelepiped, or prismatic. In the present embodiment, the second housing 20 is cylindrical. Specifically, the second housing 20 includes a second scroll 21 which extends along the first direction D1. The second scroll 21 can scroll the flexible display panel 30 onto the second housing 20 by rotation, thereby covering at least part of an outer surface of the second housing 20, and thereby increasing a display area. For example, referring to FIG. 3, in the second form, the flexible display panel 30 is scrolled on the second scroll 21 and covers at least part of a surface of the second scroll 21. The flexible display device 100 may also has a fifth form. Referring to FIG. 9, the fifth form is configured base on the first form by rotating the second scroll 21, so as to scroll the flexible display panel 30 on the second housing 20 and cover at least part of the outer surface of the second housing 20, thereby increasing the display area. In another embodiment, the flexible display panel 30 has a display surface 30*a* and a non-display surface 30*b*, and the non-display surface 30*b* of the flexible display panel 30 is fixedly connected to the second housing 20. For example, when the second housing 20 includes the second scroll 21, the flexible display panel 30 is always scrolled on the second scroll 21, and no matter how the flexible display device 100 changes its form, the second housing 20 is always located at the non-display surface 30*b* of the flexible display panel 30, so as to achieve a maximal display area.

The second housing 20 is configured for moving relative to the first housing 10. Specifically, the second housing 20 may move away from, move close to the first housing 10, rotate around the first housing 10, or rotate around the first housing 10 while moving away from or moving close to the first housing 10. The flexible display panel 30 can be deployed or scrolled between the first housing 10 and the second housing 20 according to the relative motion between the second housing 20 and the first housing 10.

The flexible display panel 30 is used for displaying images. The flexible display panel 30 can be scrolled onto the first scroll 11 in the second direction D2, or the flexible display panel 30 can be deployed from the first scroll 11 in the second direction D2. In the present embodiment, the flexible display panel 30 can also be scrolled onto the second scroll 21 in the second direction D2, or the flexible display panel 30 can be deployed from the second scroll 21 in the second direction D2.

The flexible display panel 30 may be an Organic Light-emitting Diode (OLED) display panel, an Active Matrix Organic Light-emitting Diode (AMOLED) display panel, a Passive Matrix Organic Light-emitting Diode (PMOLED) display panel, a Quantum Dot Light-emitting Diode (QLED) display panel, a Micro Light-emitting Diode (Micro-LED) display panel, or a Mini Light-emitting Diode (Mini-LED) display panel.

In the first form, a first included angle α is formed between the flexible display panel 30 and the first surface 10a, and the first included angle α is greater than 0° and less than 180°. In the second form, the flexible display panel 30 covers the second surface 10b. The flexible display panel 30 further comprises a touch module. In the second form, the first housing 10 is configured to provide a rigid supporting surface of the touch module, and the flexible display panel 30 may achieve touch control. Specifically, the flat second surface 10b provides the rigid supporting surface of the touch module.

Referring to FIG. 1, the flexible display device 100 further comprises a support component 40. In the present embodiment, one end of the support component 40 is rotatably connected to the first housing 10 and another end of the support component 40 is fixedly connected to the second housing 20. In the first form, a third included angle γ is formed between the support component 40 and the first surface 10a so as to support the second housing 20. The third included angle γ is greater than 0° and less than 180°. In the second form, the support component 40 is parallel to the first housing 10, so as to fix the flexible display panel 30 to the second surface 10b. Specifically, the second housing 20 further includes connecting portions 22 located at both sides of the second scroll 21. The support component 40 is fixedly connected to the connecting portions 22. In the present embodiment, the connecting portions 22 are insert pins. Sockets are formed in the support component 40. The insert pins are inserted into the sockets, so as to be fixedly connected to the support component 40. It is understandable that a manner by which the connecting portions 22 and the support component 40 are connected is not defined in the present disclosure.

The support component 40 is disposed on both sides, along the first direction D1, of the first housing 10. In an embodiment, the support component 40 is telescopic. Specifically, the support component 40 includes a first telescopic rod 41, a second telescopic rod 42, a third telescopic rod 43, and a fourth telescopic rod 44. The first telescopic rod 41 is rotatably connected to the first housing 10. The second telescopic rod 42 is fixedly connected to the second housing 20. One end of the third telescopic rod 43 is slidably connected to the first telescopic rod 41, and another end of the third telescopic rod 43 is slidably connected to the fourth telescopic rod 44. One end of the fourth telescopic rod 44 is slidably connected to the third telescopic rod 43, and another end of the fourth telescopic rod 44 is slidably connected to the second telescopic rod 42. It is understandable that the number of the telescopic rods that the support component 40 includes is not defined in the present disclosure. In addition, telescopic structure of the support component 40 is also not defined in the present disclosure, any kind of structure that is capable of changing length may be used as the support component 40 of the present disclosure. "Z" or "X" shaped hinge structures may be taken as specific examples. Because the support component 40 is rotatable around the first housing 10, by rotating the support component 40, relative positions of the first housing 10 and the second housing 20 may be adjusted, thereby adjusting an angle formed between the flexible display panel 30 and the first housing 10. Because the support component 40 is telescopic, by adjusting a length of the support component 40, a distance between the first housing 10 and the second housing 20 may be adjusted, thereby adjusting a size of the flexible display panel 30.

In an embodiment, the support component 40 may be an electrical support component 40. Referring to FIG. 2, the flexible display device 100 further comprises a driving component 50 for the support component 40. The driving component 50 is used for driving the support component 40 to extend and contract and/or to rotate. The driving component 50 can be disposed inside the hollow cavity 101. By driving the support component 40 to extend, the driving component 50 drives the second housing 20 to move relative to the first housing 10, thereby releasing the flexible display panel 30 from the first scroll 11, and thereby deploying the flexible display panel 30 between the first housing 10 and the second housing 20. On the contrary, by driving the support component 40 to contract, and cooperating with a rotation of the first scroll 11, the driving component 50 scrolls the flexible display panel 30 onto the first scroll 11, thereby shortening the flexible display panel 30 between the first housing 10 and the second housing 20. In addition, by driving the support component 40 to rotate, the angle formed between the flexible display panel 30 and the first housing 10 can be adjusted, thereby switching the flexible display device 100 between the multiple forms.

Figure 10:
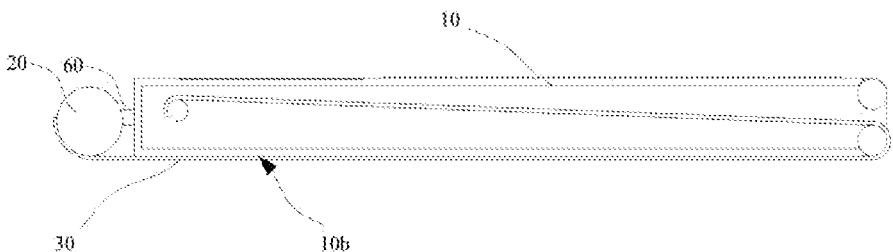
FIG. 10 is a schematic perspective view of a flexible display device in the second form, provided by another embodiment of the present disclosure.

In is noted that, in an embodiment, the support component 40 is detachably connected to the first housing 10 and/or to the second housing 20. Specifically, in an embodiment, in the third form, the support component 40 is detached from under the first housing 10 and the second housing 20. In a process in which the flexible display device 100 is switched from the third form to the first form, the second housing 20 is moved away from the first housing 10, the flexible display panel 30 is deployed, then the support component 40 is respectively attached to the first housing 10 and the second housing 20, so as to support the second housing 20 on the first housing 10, thereby fixing the flexible display panel 30. In a process in which the flexible display device 100 is switched from the third form or the first form to the second form, the support component 40 can be detached from under the first housing 10 and from the second housing 20, the second housing 20 is adjusted to an edge, which is away from the opening 102 in the second direction D2, of the first housing 10, so that the flexible display panel 30 covers the second surface 10b. Then the support component 40 is respectively attached to the first housing 10 and to the second housing 20, thereby fixing positions of the first housing 10 and the second housing 20. It is understandable that in the second form, the second housing 20 may contact the first housing 10, or the second housing 20 may keep certain distance with the first housing 10. In an embodiment, the support component 40 may be rotatably connected to the first housing 10, but is detachably connected to the second housing 20, and is connected to the second housing 20 after the location of the second housing 20 is adjusted, so as to fix the second housing 20. Referring to FIG. 10, it is a schematic perspective view of a flexible display device in a second form, provided by another embodiment of the present disclosure. In another embodiment, in the second form, the support component 40 is detached form under the first housing 10 and the second housing 20. Present, the flexible display device 100 further comprises a fixing component 60. In the second form, the fixing component 60 fixes the second housing 20 onto the first housing 10, thereby fixing the flexible display panel 30 to the second surface 10*b*.

In an embodiment, especially when the support component 40 is detachably connected to the first housing 10 and/or to the second housing 20, the support component 40 may also be of a fixed length.

Referring to FIGS. 2 and 5 again, the flexible display device 100 further comprises a first roller 70 and a second roller 80, both located between the first scroll 11 and the second housing 20. In an embodiment, the first roller 70 and the second roller 80 are disposed opposite each other. In an embodiment, the first roller 70 and the second roller 80 are both disposed inside the opening 102 and are respectively located at one of the sides of the first housing 10 in a thickness direction of the first housing 10. The first roller 70 and the second roller 80 are for sliding relatively to the flexible display panel 30 during the deployment or scrolling of the flexible display panel 30, so as to keep the flexible display panel 30 from being damaged by friction. In the first form, the flexible display panel 30 contacts the first roller 70. In addition, the flexible display panel 30 is bent by the first roller 70 acting as an inflection point. Due to a surface contact between the flexible display panel 30 and a curved surface of the first roller 70, a friction is reduced, and the flexible display panel 30 is therefore protected. In the second form, the flexible display panel 30 contacts the second roller 80. In addition, the flexible display panel 30 is bent by the second roller 80 acting as the inflection point. Due to the face contact between the flexible display panel 30 and a curved surface of the second roller 80, a friction is reduced, and the flexible display panel 30 is therefore protected.

The first to the fifth form of the flexible display device 100 of the present disclosure and switching processes between the forms are described in detail hereinbelow. The flexible display device 100 of the present disclosure may be switched between any two of the forms from the first to the fifth form. The switching processes are only described by way of example hereinbelow.

Firstly, referring to FIGS. 6 and 7, the third form may be an initial form of the flexible display panel 30. In the third form, the second housing 20 presses against one edge, in the second direction D2, of the first housing 10. One end of the flexible display panel 30 is scrollably fixed to the first scroll 11 and the other end of the flexible display panel 30 is fixed onto the second housing 20. The flexible display panel 30 and the first scroll 11 are contained together inside the hollow cavity 101 of the first housing 10. The support component 40 is located at both edges of the first housing 10 in the first direction D1, and is disposed parallel to the first housing 10, thereby reducing the space occupied by the flexible display device 100.

Referring to FIG. 2, during a process in which the flexible display device 100 is switched from the third form to the first form, the driving component 50 drives the support component 40 to extend, and stop when a predetermined length is reached, thereby bringing the second housing 20 away from the first housing 10, thereby releasing the flexible display panel 30 from the first scroll 11, and thereby deploying the flexible display panel 30 in the second direction D2. Then the driving component 50 further drives the support component 40 to rotate in a direction, which is away from the first surface 10*a*, until a predetermined angle is reached, so as to form the first included angle α between the flexible display panel 30 and the first surface 10*a*. In the process, the flexible display panel 30 and the first roller 70 slide relatively to each other. It is understandable that an order that the driving component 50 drives the support component 40 to extend and to rotate may be reversed, and the driving component 50 may also drives the support component 40 to extend and to rotate at the same time.

Referring to FIG. 9, because in the first form, the second housing 20 is located at the display surface 30*a* of the flexible display panel 30, and the flexible display panel 30 may be scrolled onto the second scroll 21 by rotating the second scroll 21, so that the flexible display panel 30 covers the surface of the second housing 20 and relocates the second housing 20 onto the non-display surface 30*b* of the flexible display panel 30, thereby increasing the display area of the flexible display device 100. This is the fifth form.

Referring to FIG. 8, during a process in which the flexible display device 100 is switched from the first form or the fifth form to the fourth form, the driving component 50 drives the support component 40 to further rotate in the direction away from the first surface 10*a*, and stop when a predetermined angle is reached. During this process, the support component 40 rotates the second housing 20 around the first housing 10, and forms the second included angle β between the flexible display panel 30 and the first surface 10*a*. The second included angle β is greater than or equal to 180° and less than 360°. In this form, the flexible display panel 30 may display images, and a stable triangle, which can support the flexible display panel 30 on a plane, is formed between the first housing 10 and the support component 40. During the process, the flexible display panel 30 and the second roller 80 slide relatively to each other.

Referring to FIG. 5, during a process in which the flexible display device 100 is switched from the fourth form to the second form, the driving component 50 drives the support component 40 to further rotate in a direction close to the second surface 10*b*, until the second housing 20 is located at the edge of the first housing 10 in the second direction D2, and the flexible display panel 30 covers the second surface 10*b*, and the flexible display panel 30 covers a surface of the second scroll 21 facing the first housing 10. When looking down on the second surface 10*b*, the flexible display panel 30 extends from the second surface 10*b* to a surface of the second scroll 21, thereby carrying out full-screen display.

Referring to FIG. 6, during a process in which the flexible display device 100 is switched from the first form or the second form to the third form, the driving component 50 drives the support component 40 in the direction close to the first surface 10*a*, until a location at which the support component 40 is parallel to the first housing 10. Then, the driving component 50 drives the support component 40 to contract and cooperate with the rotation of the first scroll 11, the flexible display panel 30 is scrolled onto the first scroll 11, and therefore shortened between the first housing 10 and the second housing 20. Finally, the flexible display panel 30 is completely scrolled onto the first scroll 11, and the second housing 20 presses against one edge of the first housing 10.

The flexible display device is provided. The flexible display device comprises the first housing, the second housing, and the flexible display panel. The first housing includes the first surface and the second surface disposed opposite each other. The second housing is disposed on one side of the first housing. One end of the flexible display panel is curlably connected to the first housing and another end of the flexible display panel is fixedly connected to the second housing. The flexible display panel is deployable or scrollable between the first housing and the second housing. The flexible display device has the first form and the second form. In the first form, the second housing is away from the first housing, the first included angle is formed between the flexible display panel and the first surface, and the first included angle is greater than 0° and less than 180°. In the second form, the second housing is located at one edge of the first housing, and the flexible display panel covers the second surface The flexible display panel of the flexible display device of the present disclosure can be deployed or scrolled according to the relative motion between the second housing and the first housing, so as to switch between the first form and the second form. In the first form, the second housing is away from the first housing, the first included angle is formed between the flexible display panel and the first surface, and the flexible display device may be used as a laptop computer. In the second form, the second housing is at one edge of the first housing, the flexible display panel covers the second surface, and the flexible display device may be used as a tablet computer. That is, the flexible display device of the present disclosure may be used in at least two forms, one of which is the laptop computer form, and the other is the tablet computer form.

In addition, the flexible display device of the present disclosure may also be used as a tablet computer with stand, therefore, the flexible display device may be used in various forms. Moreover, the flexible display device of the present disclosure also has advantages of having sample structure and low costs.

In addition, referring to FIGS. 1 and 2 again, another embodiment of the present disclosure also provides a flexible display device 100, which comprises the first housing 10, the second housing 20, the flexible display panel 30 and the support component 40.

The first housing includes the first surface 10*a* and the second surface 10*b* disposed opposite each other.

The second housing 20 is disposed on one side of the first housing 10.

One end of the flexible display panel 30 is curlably connected to the first housing 10 and another end of the flexible display panel 30 is fixedly connected to the second housing 20, wherein the flexible display panel 30 is deployable or scrollable between the first housing 10 and the second housing 20.

One end of the support component 40 is rotatably connected to the first housing 10 and another end of the support component 40*t* is fixedly connected to the second housing 20. In an embodiment, the support component 40 is telescopic. One can refer to the description hereinabove for the specific structures of the first housing 10, the second housing 20, the flexible display panel 30, and the support component 40, of the flexible display device 100 of the present embodiment, therefore the specific structure of these components is not described here.

In the flexible display device of the present embodiment, by the support component rotatable between the first housing and the second housing, the second housing may be moved relatively to the first housing, and the flexible display panel can be deployed or scrolled according to the relative motion between the second housing and the first housing, so as to switch between the first form and the second form, therefore, the flexible display device may be used in at least two forms, one of which is the laptop computer form, and the other is a tablet computer form.

The embodiments of the present disclosure are described in detail hereinabove. Specific examples are used herein to elaborate the principles and implementations of the present disclosure. The description of the above embodiments are used only to help understand the present disclosure. In addition, to one skill in the art, according to the main idea of the present disclosure, specific implementations and the range that the present disclosure is applied may be altered. Therefore, the specification should not be construed as limiting the disclosure.

What is claimed is:

1. A flexible display device, comprising:
a first housing including a first surface and a second surface disposed opposite each other;
a second housing disposed on one side of the first housing; and
a flexible display panel, one end of which is curlably connected to the first housing and another end of which is fixedly connected to the second housing, wherein the flexible display panel is deployable or scrollable between the first housing and the second housing;
wherein the flexible display device has a first form, a second form and a third form; in the first form, the second housing is away from the first housing, a first included angle is formed between the flexible display panel and the first surface, and the first included angle is greater than 0° and less than 180°; in the second form, the second housing is located at one edge of the first housing, and the flexible display panel covers the second surface; and in the third form, the flexible display panel is scrolled, and the second housing presses against one edge of the first housing.

2. The flexible display device as claimed in claim 1, wherein the flexible display device also has a fourth form; in the fourth form, the second housing is away from the first housing, a second included angle is formed between the flexible display panel and the first surface, and the second included angle is greater than or equal to 180° and less than 360°.

3. The flexible display device as claimed in claim 1, further comprising: a support component, one end of which is rotatably connected to the first housing and another end of which is fixedly connected to the second housing;
wherein, in the first form, a third included angle is formed between the support component and the first surface so as to support the second housing, the third included angle is greater than 0° and less than 180°.

4. The flexible display device as claimed in claim 3, wherein in the second form, the support component is parallel to the first housing, so as to fix the flexible display panel to the second surface.

5. The flexible display device as claimed in claim 3, wherein the support component is telescopic.

6. The flexible display device as claimed in claim 4, wherein the support component is telescopic.

7. The flexible display device as claimed in claim 1, wherein the first housing includes a first scroll, one end of the flexible display panel is scrollably disposed on the first scroll, and the other end of the flexible display panel is fixedly connected to the second housing.

8. The flexible display device as claimed in claim 7, further comprising: a first roller located between the first scroll and the second housing, wherein in the first form, the flexible display panel contacts the first roller.

9. The flexible display device as claimed in claim 7, further comprising: a second roller located between the first scroll and the second housing, in the second form, the flexible display panel contacts the second roller.

10. The flexible display device as claimed in claim 9, wherein the second housing includes a second scroll, in the second form, the flexible display panel is rolled onto the second scroll and covers a surface of the second scroll facing the first housing.

11. The flexible display device as claimed in claim 7, further comprising: a first roller and a second roller, both located between the first scroll and the second housing and disposed opposite each other;

wherein, in the first form the flexible display panel contacts the first roller, and in the second form the flexible display panel contacts the second roller.

12. The flexible display device as claimed in claim 1, wherein the flexible display panel has a display surface and a non-display surface disposed opposite each other, and the non-display surface is fixedly connected to the second housing.

13. The flexible display device as claimed in claim 1, further comprising: a fixing component, wherein in the second form, the fixing component fixes the second housing onto the first housing.

14. The flexible display device as claimed in claim 1, further comprising: a keyboard fixedly disposed on the first surface or detachably mounted onto the first surface.

15. The flexible display device as claimed in claim 1, further comprising: a touch module;

wherein in the second form, the first housing is configured to provide a rigid supporting surface of the touch module.

16. A flexible display device, comprising:

a first housing including a first surface and a second surface disposed opposite each other;

a second housing disposed on one side of the first housing; and a flexible display panel, one end of which is curlably connected to the first housing and another end of which is fixedly connected to the second housing, wherein the flexible display panel is deployable or scrollable between the first housing and the second housing; and a support component, one end of which is rotatably connected to the first housing and another end of which is fixedly connected to the second housing, wherein the support component is telescopic.

17. The flexible display device as claimed in claim 16, wherein the first housing includes a first scroll, one end of the flexible display panel is scrollably disposed on the first scroll, and the other end of the flexible display panel is fixedly connected to the second housing;

wherein the second housing includes a second scroll and connecting portions located at both sides of the second scroll, the support component is fixedly connected to the connecting portions.

18. The flexible display device as claimed in claim 16, further comprising: a first roller and a second roller, both located between the first scroll and the second housing and disposed opposite each other.

19. A flexible display device, comprising:

a first housing including a first surface and a second surface disposed opposite each other;

a second housing disposed on one side of the first housing; and a flexible display panel, one end of which is curlably connected to the first housing and another end of which is fixedly connected to the second housing, wherein the flexible display panel is deployable or scrollable between the first housing and the second housing; and a support component, one end of which is rotatably connected to the first housing and another end of which is fixedly connected to the second housing;

wherein the first housing includes a first scroll, one end of the flexible display panel is scrollably disposed on the first scroll, and the other end of the flexible display panel is fixedly connected to the second housing;

wherein the second housing includes a second scroll and connecting portions located at both sides of the second scroll, the support component is fixedly connected to the connecting portions.

\*   \*   \*   \*   \*